(12) United States Patent
Takani et al.

(10) Patent No.: US 9,936,775 B2
(45) Date of Patent: Apr. 10, 2018

(54) END STOP, SLIDE FASTENER AND ORNAMENTAL FASTENER

(71) Applicant: YKK Corporation, Tokyo (JP)

(72) Inventors: Go Takani, Toyama (JP); Ryusaku Watanabe, Tokyo (JP); Daisuke Hayashi, Tokyo (JP)

(73) Assignee: YKK Corporation (JP)

( * ) Notice: Subject to any disclaimer, the term of this patent is extended or adjusted under 35 U.S.C. 154(b) by 528 days.

(21) Appl. No.: 14/573,490

(22) Filed: Dec. 17, 2014

(65) Prior Publication Data

US 2015/0173464 A1 Jun. 25, 2015
US 2017/0181507 A9 Jun. 29, 2017

(30) Foreign Application Priority Data

Dec. 19, 2013 (JP) .............................. 2013-007220 U

(51) Int. Cl.
*A44B 19/36* (2006.01)

(52) U.S. Cl.
CPC .................................. *A44B 19/36* (2013.01)

(58) Field of Classification Search
CPC ......... A44B 19/36; A44B 19/60; A44B 19/38; A44B 19/02; Y10T 24/2593; Y10T 24/3683; Y10T 24/3611; Y10T 24/366
See application file for complete search history.

(56) References Cited

U.S. PATENT DOCUMENTS

| 1,646,053 | A | * | 10/1927 | Clark | ................. A44B 1/44 24/95 |
| 1,704,579 | A | * | 3/1929 | Sanford | ................. A44B 19/38 24/390 |
| 1,960,010 | A | * | 5/1934 | Hopkinson | ......... A44B 19/305 24/406 |

(Continued)

FOREIGN PATENT DOCUMENTS

| EP | 1 900 298 A2 | 3/2008 |
| JP | 49-105307 | 12/1947 |

(Continued)

OTHER PUBLICATIONS

European Search Report, European Patent Application No. 14004223.5, dated Apr. 9, 2015.

*Primary Examiner* — Jason W San
(74) *Attorney, Agent, or Firm* — Kilpatrick Townsend & Stockton LLP

(57) ABSTRACT

There is provided an end stop. A male member and a female member are configured to sandwich opposing side edge portions of a pair of fastener tapes from both sides thereof in an upward and downward direction. The male member includes a circular disk-shaped male base member and an inserting male portion. The female member includes a circular disk-shaped female base member and a receiving female portion. A facing surface of at least one of the male base portion and the female base portion is provided with a protrusion group. The protrusion group is configured so that (Continued)

a plurality of protrusions protruding to come at least in contact with each fastener tape are arranged to be spaced from each other at predetermined angles over the entire circumference of the facing surface along a circumferential direction thereof.

18 Claims, 10 Drawing Sheets

(56) References Cited

U.S. PATENT DOCUMENTS

| | | | | |
|---|---|---|---|---|
| 2,039,976 | A * | 5/1936 | Norton | A44B 19/38 24/434 |
| 2,044,161 | A * | 6/1936 | Forster | A44B 19/36 24/436 |
| 2,068,501 | A * | 1/1937 | Marinsky | A44B 19/36 24/435 |
| 2,161,329 | A * | 6/1939 | Wittenberg | A44B 19/36 24/436 |
| 2,312,045 | A * | 2/1943 | Morin | A44B 19/36 24/265 A |
| 2,460,124 | A * | 1/1949 | Carlile | A44B 19/36 24/436 |
| 2,483,703 | A * | 10/1949 | Legat | A44B 19/36 24/436 |
| 2,501,169 | A * | 3/1950 | Gould | A44B 19/36 24/435 |
| 2,549,051 | A * | 4/1951 | Brown | A44B 19/36 24/403 |
| 2,622,248 | A * | 12/1952 | Schaye | A41B 13/005 2/80 |
| 2,988,796 | A * | 6/1961 | Johns | A44B 19/36 24/436 |
| 3,087,217 | A * | 4/1963 | Morin | A44B 19/36 24/435 |
| 3,482,292 | A * | 12/1969 | Frohlich | A44B 19/36 24/383 |
| 3,892,016 | A * | 7/1975 | Brown | A44B 19/32 24/386 |
| 4,139,927 | A * | 2/1979 | Heimberger | A44B 19/38 24/434 |
| 4,232,430 | A * | 11/1980 | Friedberg | A44B 19/38 24/388 |
| 4,326,319 | A * | 4/1982 | Friedberg | A44B 19/38 24/386 |
| RE31,487 | E * | 1/1984 | Friedberg | A44B 19/38 24/386 |
| 4,437,210 | A * | 3/1984 | Fukuroi | A44B 19/36 24/435 |
| 4,587,694 | A * | 5/1986 | Asahi | A44B 19/36 24/435 |
| 4,751,771 | A * | 6/1988 | Watanabe | A44B 1/08 24/114.4 |
| 4,756,061 | A * | 7/1988 | Jones | A44B 19/36 24/433 |
| 4,982,480 | A * | 1/1991 | Kasai | A44B 17/0029 24/104 |
| 5,173,997 | A * | 12/1992 | Takezawa | B60R 22/023 24/104 |
| 5,575,043 | A * | 11/1996 | Candotti | A44B 1/34 24/103 |
| 5,749,134 | A * | 5/1998 | Zemitis | A44B 19/00 24/381 |
| 5,940,940 | A * | 8/1999 | Tanikoshi | A44B 17/0082 24/108 |
| 6,088,888 | A * | 7/2000 | Oda | A44B 19/38 24/433 |
| 6,421,887 | B1 * | 7/2002 | Oda | A44B 19/38 24/433 |
| 6,442,808 | B2 * | 9/2002 | Fildan | A41C 3/00 2/265 |
| 6,510,595 | B2 * | 1/2003 | Matsushima | A44B 19/388 24/399 |
| 6,757,945 | B2 * | 7/2004 | Shibuya | A47G 27/0418 16/8 |
| 6,826,810 | B2 * | 12/2004 | Ichikawa | A44B 19/388 24/381 |
| 7,013,539 | B2 * | 3/2006 | Fildan | A44B 17/0035 2/265 |
| 7,251,865 | B2 * | 8/2007 | Takamura | A44B 1/08 24/113 MP |
| 7,320,158 | B2 * | 1/2008 | Deto | A41F 1/002 24/303 |
| 7,526,839 | B2 * | 5/2009 | Yang | A44B 1/14 24/104 |
| 7,546,661 | B2 * | 6/2009 | Connor, Jr. | B60N 3/046 16/4 |
| 7,752,718 | B2 * | 7/2010 | Fisher | A44B 17/0035 24/114.4 |
| 7,882,602 | B2 * | 2/2011 | Himi | A44B 19/26 24/433 |
| 8,407,868 | B2 * | 4/2013 | Chung | A44B 13/007 114/114 |
| 8,522,404 | B2 * | 9/2013 | Matei | A44B 1/28 24/104 |
| 8,776,330 | B2 * | 7/2014 | Keyaki | A44B 19/36 24/434 |
| 9,027,210 | B2 * | 5/2015 | Peters | A44B 99/00 24/303 |
| 9,199,567 | B1 * | 12/2015 | Kaufman | B60N 3/046 |
| 2002/0029444 | A1 * | 3/2002 | Lyle | A44B 17/0029 24/621 |
| 2005/0050699 | A1 * | 3/2005 | Yoneoka | A44B 19/38 24/433 |
| 2008/0066269 | A1 * | 3/2008 | Yoneoka | A44B 19/36 24/433 |
| 2014/0150216 | A1 * | 6/2014 | Fukuyama | A44B 19/36 24/436 |

FOREIGN PATENT DOCUMENTS

| | | | |
|---|---|---|---|
| JP | 2009268615 A * | 11/2009 | A44B 19/06 |
| JP | WO 2012056519 A1 * | 5/2012 | A44B 1/02 |
| WO | 2012/043047 A1 | 4/2012 | |

* cited by examiner

END STOP, SLIDE FASTENER AND ORNAMENTAL FASTENER

TECHNICAL FIELD

The present invention relates to an end stop used in a slide fastener, a slide fastener and an ornamental fastener employing such an end stop.

BACKGROUND

Slide fasteners have an increased thickness portion, referred to as a core portion, provided on each of opposing right and left side edge portions of a pair of fastener tapes extending in a front and rear direction, and a pair of element rows are fixed to such a pair of core portions. As one of slide fasteners, a slide fastener is known in which end stops for connecting the pair of fastener tapes are provided on the pair of element rows in an extending direction thereof.

As one example of such conventional end stops, an end stop is known in which a male member referred to as a bottom stopper member and a female member referred to as a nut are provided and the male member and the female member are fitted into one another and fixed to sandwich the pair of fastener tapes from upper and lower sides of the pair of core portions (Patent Document 1).

The male portion includes a circular disk-shaped base portion and an inserting male portion, referred to as a shaft, protruding from one surface of front and back surfaces of the base portion. In one surface (a facing surface facing the female member) of the base portion on the inserting male portion side thereof, a notched groove allowing one surface of front and back surfaces of the pair of core portions to pass therethrough is provided. More specifically, the notched groove is formed in a straight line to extend through a circular center portion of the base portion.

Patent Document 1: Japanese Utility Model Application Publication No. S49-105307

To attach the male member to the pair of fastener tapes, the male member has to be positioned relative to the pair of fastener tapes so that the notched groove can be fitted on one surface of front and back surfaces of the pair of core portions.

However, it is difficult to say that such a positioning operation is easy. The reason is in that an outer contour of the male member is a circular shape, and such a circular shape is an unsuitable shape in positioning because there is no rotation inhibiting shape, such as an angled portion or an elliptical shape, which is typically used in positioning. Meanwhile, as one of slide fasteners, a slide fastener is known which does not have a pair of core portions, and when attempting to attach an end stop, which includes a male member and a female member having a circular outer contour, to such a slide fastener, it is to say that a positioning operation is likewise difficult.

SUMMARY

It is therefore an object of the present invention to provide an end stop which includes a male member and a female member having a circular outer contour and can be easily attached to opposing right and left side edge portions of a pair of fastener tapes.

According to an aspect of the embodiments of the present invention, there is provided an end stop for connecting a pair of fastener tapes, which extend in a front and rear direction, along an extending direction of a pair of element rows fixed along opposing right and left side edge portions of the pair of fastener tapes, the end stop comprising: a male member and a female member configured to sandwich the opposing right and left side edge portions of the pair of fastener tapes from both sides thereof in an upward and downward direction, which is a thickness direction thereof, the male member and the female member having a circular outer contour; wherein the male member comprises a circular disk-shaped male base member and an inserting male portion protruding in a concentric shape from the male base portion to be inserted into the female member, wherein the female member comprises a circular disk-shaped female base member and a receiving female portion formed in a concentric shape with the female base portion to receive and connect at least a part of the inserting male portion, wherein a facing surface of at least one of the male base portion and the female base portion is provided with a protrusion group protruding therefrom, and wherein the protrusion group is configured so that a plurality of protrusions protruding to come at least in contact with each fastener tape are arranged to be spaced from each other at predetermined angles over the entire circumference of the facing surface along a circumferential direction thereof.

Also, the male member may be configured so that the inserting male member and the protrusion group are formed as identical things or different things. In a case of different things, the following configuration is preferable.

That is, the receiving female portion is formed on the center portion of the female base portion. The inserting male portion is a different thing from the protrusion group. Also, the inserting male portion is formed on the center portion of the male base portion, and is connected to the receiving female portion after passing through a gap formed between the opposing right and left side edge portions of the pair of fastener tapes. The protrusions are arranged on the facing surface to be located more radially outward than the inserting male portion.

Because the protrusions constituting the protrusion group are configured to come at least in come with each fastener tape, a protruding length of each protrusion may be set to cause the pair of fastener tapes to be recessed or to penetrate the pair of fastener tapes.

Also, in a case where the inserting male portion and the protrusion group are formed as identical things, the identical things penetrate the pair of fastener tape, and the pair of fastener tapes damaged by such a penetration has a reduced durability. In order not to reduce durability of the pair of fastener tapes if at all possible, the following configuration is preferable.

That is, the end stop is an end stop for connecting the pair of fastener tapes in which the opposing right and left side edge portions are core portions having a thickness thicker than adjoining portions laterally adjacent thereto. Further, the protrusions, which constitute the protrusion group as a different thing from the inserting male portion, have a protruding length causing to the core portions to be recessed.

All protrusions constituting the protrusion group may be arranged so that at least one protrusion cause each core portion to be recessed, but in order to more firmly connect the end stop to the pair of fastener tapes, the following configuration is preferable.

That is, two or more protrusions are arranged to be spaced from each other at predetermined angles within each half circumference range of the facing surface along the circumferential direction, and thus to cause each core portion to be recessed at two or more locations.

Also, all protrusions constituting the protrusion group may be arranged in any manner if the protrusions can come at least in contact with the opposing right and left side edge portions of the pair of fastener tapes. However, in a case where all protrusions except one protrusion are arranged to be spaced from each other at equal angles over the entire circumference of the facing surface along the circumferential direction and the remaining one protrusion is arranged to be spaced by an angle different from the equal angle, a fixing strength of the end stop to the pair of fastener tapes is likely to be influenced to how the remaining one protrusion are arranged with respect to the opposing side edge portions, i.e., how the end stop is arranged along the circumferential direction with respect to the pair of fastener tapes. In order to eliminate such an influence if at all possible, the following configuration is preferable.

That is, the plurality of protrusions are arranged to be spaced from each other at equal angles over the entire circumference of the facing surface along the circumferential direction.

As one specific example, the number of protrusions arranged to be spaced from each other at equal angles over the entire circumference of the facing surface along the circumferential direction is a positive integer of 8 or greater and 32 or smaller.

Also, whether a plurality of protrusions constituting the protrusion group are arranged on one circle circumference about the center of the facing surface or not does not matter. However, in order to cause each core portion to be recessed in different locations in a radial direction about the center of the facing surface and thus to hardly allow the core portions to be fallen out of the end stop in the right and left direction, the following configuration is preferable.

That is, the plurality of protrusions are arranged in a multiple concentric circle shape.

Also, the facing surfaces of the male member and the female member may just have the inserting male portion, the receiving female portion and the protrusion group, but in order to hardly allow the end stop to be fallen out of the pair of fastener tapes, the following configuration is preferable.

That is, a facing surface of at least one of the male member and the female member is provided with an outer ring protruding over the entire circumference of an outer circumferential edge portion thereof and configured to come in contact with a pair of core portions.

In addition, the protrusion group may be arranged at any locations in the radial direction about the center of the facing surface, but in order to prevent the inserting male portion from being rattled in the gap of a pair of opposing right and left side edge portions, and thus to hardly allow the end stop to be fallen out of the pair of fastener tapes, the following configuration is preferable.

That is, the protrusion group is arranged to be closer to the inserting male portion than the outer ring in a radial direction of the facing surface.

The end stop as described can be employed in a slide fastener or an ornamental fastener as follows.

That is, the slide fastener includes the end stop, a pair of fastener tapes extending in a front and rear direction and respectively arranged on the right and left sides, a pair of element rows fixed along opposing right and left side edge portions of the pair of fastener tapes, and a slider configured to move along the pair of element rows and also to engage and disengage the pair of element rows with each other.

Also, the ornamental fastener includes the end stop, a pair of fastener tapes extending in a front and rear direction and respectively arranged on the right and left sides, and a pair of element rows fixed along opposing right and left side edge portions of the pair of fastener tapes and kept engaged with each other.

According to the end stop of the present invention, because a plurality of protrusions are arranged to be spaced from each other at predetermined angles over the entire circumference of a facing surface of at least one of the male member and the female member along a circumferential direction thereof. The male member and the female member having a circular outer contour can be connected to a pair of fastener tapes without positioning the male member and the female member. Meanwhile, the right and left side edge portions are sandwiched between the male member and the female member, and in addition, the end stop is firmly connected to the pair of fastener tapes by the protrusion group protruding from the facing surface.

Also, if using the end stop which is configured to connect the pair of fastener tape having the opposing right and left side edge portions formed as core portions having a thickness thicker than adjoining portions laterally adjacent thereto, each core portion can be recessed. Accordingly, reduction in durability of the pair of fastener tapes can be prevented if at all possible.

Further, when each core portion is recessed at two or more locations using the end stop, in which two or more protrusions are arranged to be spaced from each other at predetermined angles within each half circumference range of the facing surface along the circumferential direction. Accordingly, the end stop can be firmly connected to the pair of fastener tapes.

Further, if using the end stop in which the plurality of protrusions are arranged to be spaced from each other at equal angles over the entire circumference of the facing surface along the circumferential direction, a fixing strength of the end stop to the pair of fastener tapes can hardly be influenced even if the end stop is arranged in any manner along the circumferential direction with respect to the pair of fastener tapes. Therefore, a desirable fixing strength can be obtained.

In addition, if using the end stop in which the plurality of protrusions are arranged in a multiple concentric circle shape, each core portion can be recessed in different locations in a radial direction about the center of the facing surface, so that the end stop can be firmly connected to each core portion (to hardly allow the core portions to be fallen out of the end stop).

Further, if using the end stop in which a facing surface of at least one of the male member and the female member is provided with an outer ring protruding over the entire circumference of an outer circumferential edge portion thereof and configured to come in contact with a pair of core portions, the protrusions and the outer ring can cause each core portion to be recessed, thereby hardly allowing each core portion to be fallen out of the end stop.

Also, if using the end stop in which the protrusion group is arranged to be closer to the inserting male portion than the outer ring in a radial direction of the facing surface, the inserting male portion is hardly rattled in the gap of a pair of opposing right and left side edge portions, thereby hardly allowing each core portion to be fallen out of the end stop.

BRIEF DESCRIPTION OF THE DRAWINGS

In the accompanying drawings:

FIGS. 8A and 8B are views showing a first variant of the male member used in the end stop according to the first embodiment, in which FIG. 8A shows an arrangement relationship of protrusions and FIG. 8B is a sectional view of the male member showing a shape of the protrusions;

FIGS. 9A and 9B are views showing a second variant of the male member used in the end stop according to the first embodiment, in which FIG. 9A is a perspective view thereof and FIG. 9B is a sectional view;

DETAILED DESCRIPTION OF THE EMBODIMENTS

Figure 1:
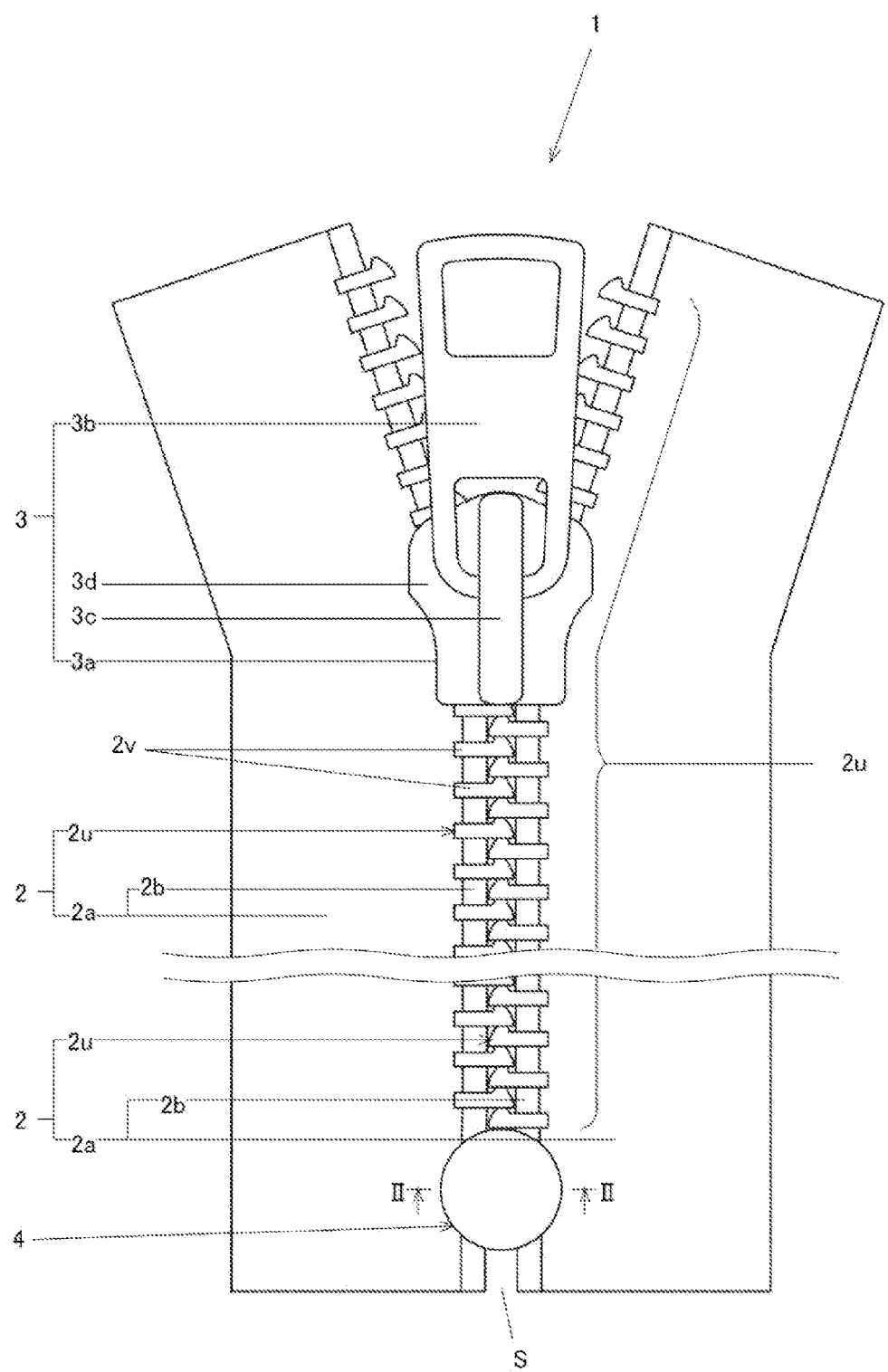
FIG. 1 is a plan view showing one example of a slide fastener employing an end stop according to a first embodiment of the present invention.

As shown in FIG. 1, one example of a slide fastener 1 employing an end stop 4 according to a first embodiment of the present invention includes a pair of fastener stringers 2 and 2 extending in a front and rear direction and respectively arranged on the right and left sides, a slider 3 configured to move along opposing side edge portions of the pair of fastener stringers 2 and 2 in the front and rear direction, and the end stop 4 configured to connect the pair of fastener stringers 2 and 2 at a location near to one side (rear side in the figure) in an extending direction of a movement range of the slider 3 and also to define one end of the movement range of the slider 3. Meanwhile, it will be noted that such one example of the slide fastener 1 has stopper members (not shown) fixed on each fastener stringer 2 at a location near to a side opposite to the end stop 4 in the extending direction of the movement range of the slider 3 and configured to define the other end of the movement range of the slider 3. The pair of fastener stringers 2 and 2 are opened and closed by moving the slider 3 in the front and rear direction. Also, the slider 3 collides against the end stop 4 if reaching a rearward limit location of the movement range and collides against a pair of stopper members if reaching a forward limit location of the movement range. When explaining directions in the following, a front side refers to an upper side in FIG. 1 and is a direction of closing the pair of fastener stringers 2 and 2 by the slider 3, and a rear side refers to a lower side in FIG. 1 and is a direction of opening the pair of fastener stringers 2 and 2 by the slider 3. Also, a direction, which is perpendicular to the front and rear direction and along which the pair of fastener stringers 2 and 2 are arranged, is referred to as a right and left direction (width direction) and a direction, which is perpendicular to the front and rear direction and the right and left direction, is referred to as an upward and downward direction (thickness direction). A left side refers to a left side in FIG. 1, and a right side refers to a right side in FIG. 1. An upper side refers to a front side in a direction perpendicular to the paper surface of FIG. 1, i.e., a direction perpendicular to the front and rear direction and the right and left direction, and a lower side refers to a back side in the direction perpendicular to the paper surface of FIG. 1.

The pair of fastener stringers 2 and 2 includes a pair of fastener tapes 2a and 2a extending in the front and rear direction and arranged parallel to each other in the right and left direction, and a pair of element rows 2u and 2u fixed along opposing right and left side edge portions of the pair of fastener tapes 2a and 2a.

Figure 2:
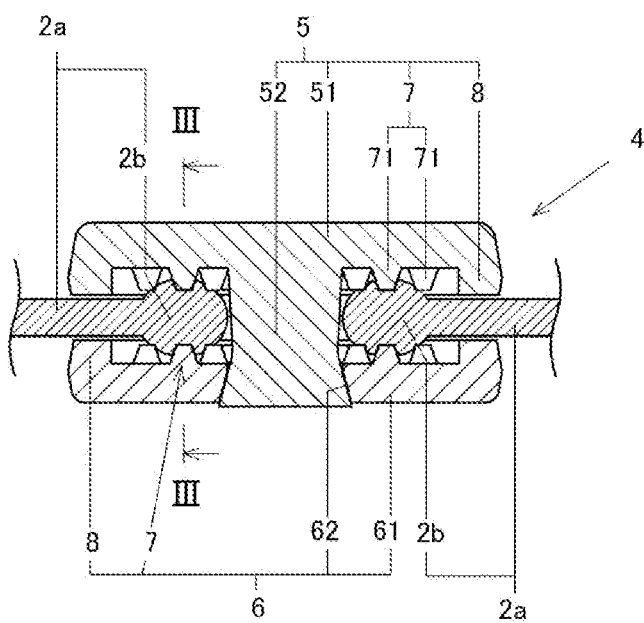
FIG. 2 is a sectional view taken along a line II-II in FIG. 1.

Each fastener tape 2a has a band shape elongated in the front and rear direction, and a thickness direction thereof corresponds to the upward and downward direction. As shown in FIG. 2, each fastener tape 2a, in which one of right and left side edge portions on which the element row 2u is fixed is referred to as a core portion 2b, is formed so that the core portion 2b has a thickness thicker than a thickness of an adjoining portion 2c laterally adjacent to the core portion 2b and thus protrudes upward and downward. In this example, although the core portion 2b is integrally formed with the fastener tape 2a, the core portion may be formed by attaching a separate member to the fastener tape 2a by sewing or the like.

Each element row 2u is formed by a plurality of elements 2v, which are arranged along the opposing side edge portion of the fastener tape 2a to be spaced from each other in the front and rear direction. In the present embodiment, the plurality of elements 2v are independently formed from each other and thus each element 2v is fixed to the core portion 2b. If the slider 3 is moved forward to close the pair of fastener stringers 2 and 2, the elements 2v the pair of element rows 2u and 2u are engaged with each other, and when the slider 3 collides against the stopper members, the slider 3 is prevented from being further moved forward. Also, if the slider 3 is moved rearward to open the pair of fastener stringers 2 and 2, the elements 2v of the pair of element rows 2u and 2u are disengaged from each other in the right and left direction, and when the slider 3 collides against the end stop 4, the slider 3 is prevented from being further moved rearward.

A gap S is formed between the opposing right and left side edge portions of the pair of fastener tapes 2a and 2a in an extending direction of the pair of element rows 2u and 2u. A dimension of the gap S in the right and left direction corresponds to a dimension, in the right and left direction, of an engaged portion of the pair of element rows 2u and 2u in an engaged state.

The slider 3 includes a slider body 3a configured to be engaged with the pair of element rows 2u and 2u and also to move in the front and rear direction, and a pull tab 2b pivotally supported on the slider body 3a. Although not shown, the slider body 3a is provided with an element passage (not shown) extending therethrough in the front and rear direction and tape grooves communicated with the element passage and opened in the right and left direction. The pair of element rows 2u and 2u pass through the element passage and each fastener tape 2a passes through the respective tape groove. Also, the slider body 3a is provided with a pull tap attachment portion 3c as a part thereof and in the shown example, the pull tap attachment portion 3c is provided to protrude from an upper surface of an upper blade 3d, which is configured to guide upper sides of a pair of elements, and has a through-hole (not shown) extending therethrough in the right and left direction. A part of the pull tap 3b is inserted through the through-hole so that the pull tap 3b is pivotally supported on the slider body 3a.

The end stop 4 according to the first embodiment of the present invention includes a male member 5 and a female member 6 configured to sandwich the opposing right and left side edge portions of the pair of fastener tapes 2a and 2a from both sides in the upward and downward direction, which is a thickness direction thereof. Meanwhile, the male member 5 and the female member 6 are made of metal.

As shown in FIGS. 2 to 5B, the male member 5, which have a circular outer contour as viewed from the upper side, includes a circular disk-shaped male base portion 51, an inserting male portion 52 protruding from the center portion of a facing surface, which faces the female member 6, of two circular surface, which correspond respectively to upper and lower surfaces of the male base portion 51, to be of a concentric shape with the facing surface, a protrusion group 7 protruding in a region of the facing surface of the male base portion 51, which is located more toward an outer circumference thereof than the inserting male portion 52, to be of a multiple concentric circle shape, and an outer ring 8 protruding from an outer circumferential edge portion of the facing surface of the male base portion 51 over the entire circumference thereof.

As used herein, the term 'concentric shape' means a state where the centers are coincided with each other, and herein a state where the center of the inserting male portion 52 and the center of the facing surface of the male base portion 51 are coincided with each other. Also, the term 'concentric circle shape' means a state where two or more circles having different radiuses are arranged to share the center thereof between each other, and herein a state where a plurality of protrusions 71 constituting the protrusion group 7 are arranged on two or more circle circumferences.

A diameter of the male base portion 51 is set to be larger than the sum of the dimension, in the right and left direction, of the gap S formed between a pair of core portions 2b and 2b and width dimensions of two core portions 2b arranged on both sides of the gap S.

The inserting male portion 52 is a different thing from the protrusion group 7. Also, the inserting male portion 52 is of a circular columnar shape. More specifically, the inserting male portion 52 is configured to become gradually thinner toward a tip end thereof and also to have an inclined angle of such a taper varied along a protruding direction. Thus, the inserting male portion 52 has a cylindrical portion configured to become gradually thinner at a gentle angle from a part thereof, which is continued to the male base portion 51, toward a rear end of a front part thereof, and a conical portion configured to become gradually thinner at a steep angle from the rear end of the front part toward the tip end. Meanwhile, the inserting male portion 52 has a part configured to be arranged in the gap S formed between the opposing side edge portions of the pair of fastener tapes 2a and 2a, and such a part is preferably formed to have a diameter equal to or smaller than the dimension of the gap S in the right and left direction.

Each protrusion 71 is formed in an identical shape. Also, each protrusion 71 has a tip end formed by a horizontal surface and is formed in a circular columnar shape configured to become gradually thinner toward an outer circumference of the tip end. In addition, the protrusion 71 is configured so that in a state where each fastener tape 2a is sandwiched by the male member 5 and the female member 6, a length by which the protrusion 71 protrudes from the male base portion 51, i.e., a protruding length L1 has a length dimension, which causes the core portion 2b of the fastener tape 2a to be recessed.

Figure 4A:
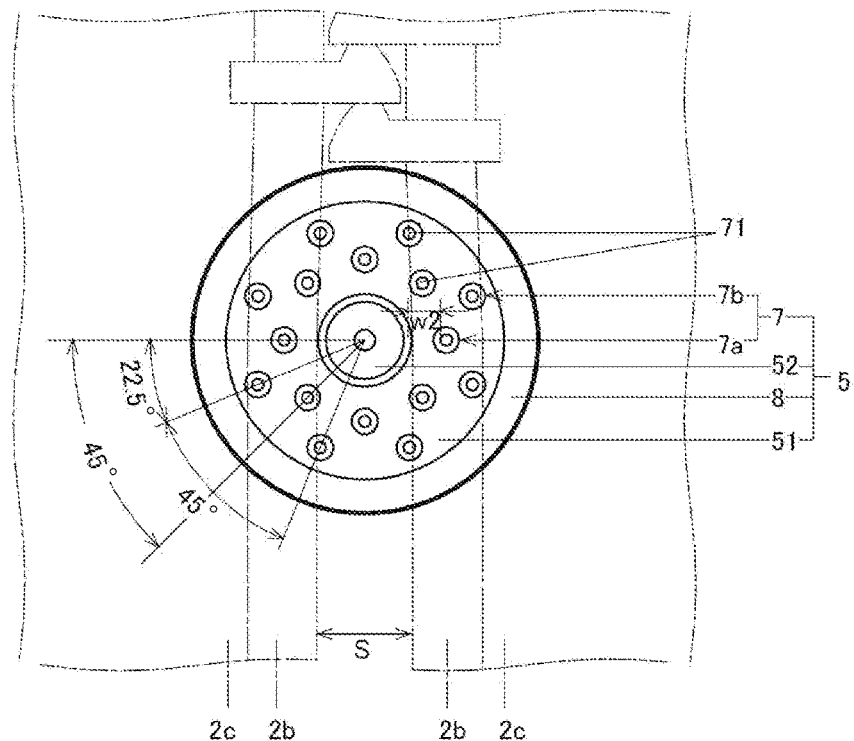
FIGS. 4A and 4B are explanatory views showing a protrusion group of a male member of the end stop according to the first embodiment.
Figure 4B:
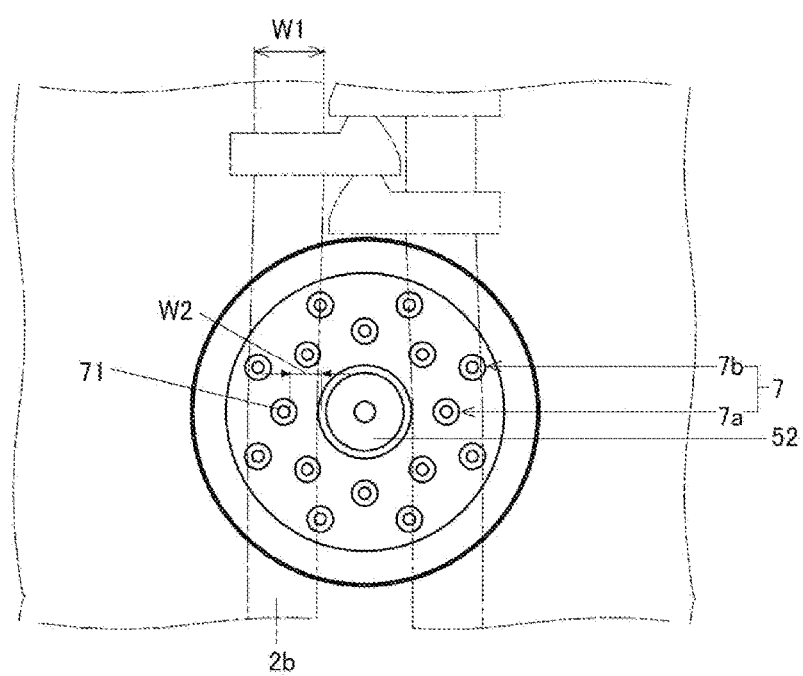
Figure 5A:
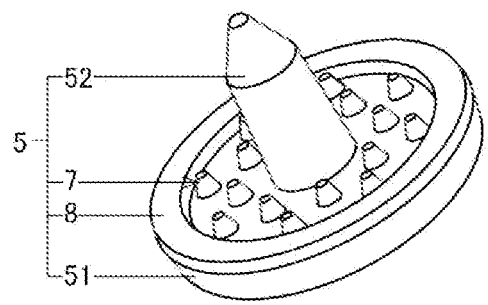
FIGS. 5A and 5B are a perspective view of the male member of the end stop according to the first embodiment and a sectional view including an enlarged view of a part thereof.
Figure 5B:
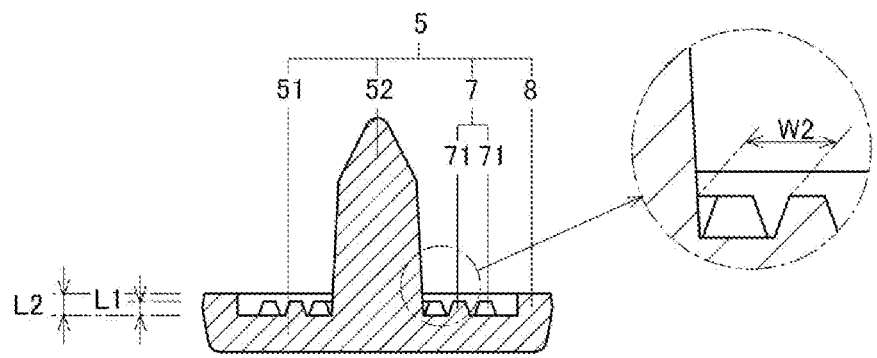
Figure 6A:
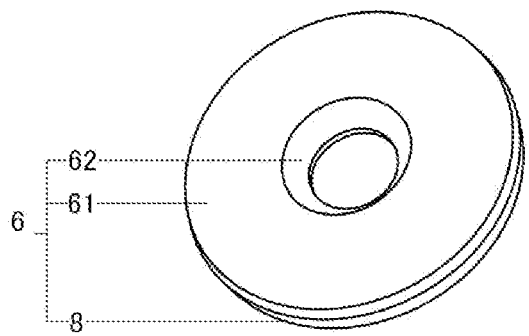
FIGS. 6A and 6B are a perspective view and a sectional view of a female member of the end stop according to the first embodiment.
Figure 6B:
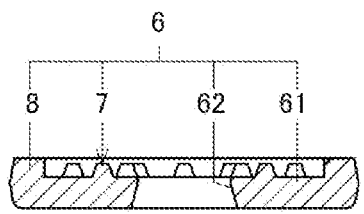

As shown in FIGS. 4A and 4B, the protrusion group 7 is constituted of first and second protrusion groups 7a and 7b arranged on the facing surface of the male base portion 51 in a dual concentric circle shape. The first protrusion group 7a is arranged on an inner circumference side of the dual concentric circle shape, and the second protrusion group 7b is arranged on an outer circumference side of the dual concentric circle shape. In addition, the first protrusion group 7a is arranged closer to the inserting male portion 52 than the outer ring 8 in a radial direction of the facing surface.

Each of the first and second protrusion groups 7a and 7b is constituted of eight protrusions 71. Also, the first protrusion group 7a is configured so that the protrusions 71 are arranged on one circle circumference about the center of the male base portion 51 at every 45° as an equal angle. The second protrusion group 7b is configured so that the protrusions 71 are arranged on another circle circumference (circle circumference having a diameter larger than the circle circumference on which the first protrusion group 7a is arranged) about the center of the male base portion 51 at every 45°. Thus, the protrusions 71 constituting the first and second protrusion groups 7a and 7b are arranged on the respective circle circumference at every 45° as an equal angle. Also, each of the first and second protrusion groups 7a and 7b is configured so that two or more protrusions 71 are arranged on each half circumference of the entire circle circumference. In addition, all protrusions 71 constituting the first protrusion group 7a are arranged so that the center of each protrusion 71 is positioned at a location on one circle circumference corresponding to the middle of the core portions 2b in the right and left direction, and all protrusions 71 constituting the second protrusion group 7b are arranged so that the center of each protrusion 71 is positioned at a location on another circle circumference and also at one side end, which is located remote from the gap S, of right and left side ends of the core portion 2b. Meanwhile, the tip end surfaces of all protrusions 71 constituting the first protrusion group 7a are a circular surface, and thus a circle circumference of a trajectory formed by connecting such circular surfaces has a width in the radial direction. Similarly, the tip end surfaces of all protrusions 71 constituting the second protrusion group 7b are also a circular surface, and thus a circle circumference of a trajectory formed by connecting such circular surfaces has a width in the radial direction. Such two circle circumferences having widths in the radial direction are arranged at different locations in the radial direction so as not to be overlapped with each other.

Further, the protrusions 71 constituting the second protrusion group 7b are arranged at locations shifted relative to the protrusions 71 constituting the first protrusion group 7a by 22.5°, which is ½ of 45°, in a circumferential direction about the center of the male base portion 51. Therefore, the protrusion group 7 constituted of the first and second protrusion groups 7a and 7b are configured so that the protrusions 71 are arranged at every 22.5° in the circumferential direction about the center of the male base portion 51. Namely, the protrusion group 7 is configured so that the protrusions 71 are arranged at every 22.5°, which is a value obtained by dividing 360, which is a value of a circle circumference angle, by a positive integer m=16.

Meanwhile, a distance W2 between the tip end of each protrusion 71 constituting the first protrusion group 7a and a side surface of the inserting male portion 52 (a distance by which the protrusion is spaced from the center of the male base portion 51) is preferably designed to be equal to or smaller than a width W1 of the core portion 2b, i.e., to obtain a relationship of W2≤W1. Herein, the tip end of the protrusion 71 is formed by a horizontal circular surface and thus when drawing a horizontal line from the center of the circular surface toward the center of the circular columnar-shaped inserting male portion 52, a distance between a point, at which the horizontal line intersect a circle defining an outer contour of the circular surface, and a point, at which the horizontal line intersect an outer circumferential surface of the inserting male portion 52, is the distance W2 as described herein.

The outer ring 8 is configured to more protrude from the facing surface of the male base portion 51 than in each protrusion 71 of the protrusion group 7 and has a tip end surface formed by a band-shaped circular arc surface, which is a horizontal surface. Also, the outer ring 8 is configured so that in a state where each fastener tape 2a is sandwiched by the male member 5 and the female member 6, a length by which the outer ring 8 protrudes from the male base portion 51, i.e., a protruding length L2 has a length dimension, which causes the core portion 2b of the fastener tape 2a to be recessed and also is longer than the protruding length L1 of the protrusion 71. Therefore, the outer ring 8 is configured so that parts thereof facing the core portions 2b cause the core portion 2b to be recessed, but parts thereof facing the adjoining portions 2c adjacent to the core portions 2b are located close to the adjoining portion 2c.

As shown in FIGS. 2, 3, 6A and 6B, the female member 6 is the female member 6, which have a circular outer contour as viewed from the lower side, includes a circular disk-shaped female base portion 61, a receiving female portion 62 formed in a concentric shape with a facing surface, which faces the male member 5, of two circular surface of the female base portion 61, a protrusion group 7 constituted of a plurality of protrusions 71 protruding from the facing surface of the female base portion 61 in an outer circumference side of the female member 6 to be of a multiple concentric circle shape, and an outer ring 8 protruding from the facing surface of the female base portion 61 over the entire circumference of an outer circumferential edge portion thereof. The receiving female portion 62 has a hole shape (more particularly, a through-hole) formed in the center portion of the female base portion 61, and the through-hole is formed by a tapered cylindrical surface having a diameter gradually decreased from a surface, which is opposite to the facing surface, toward the facing surface. Meanwhile, the protrusion group 7 of the female member 6 has the same configurations as those of the protrusion group 7 of the male member 5 and also the outer ring 8 of the female member 6 has the same configurations as those of the outer ring 8 of the male member 5, and accordingly, the detailed description thereof will be omitted.

The end stop 4 of the first embodiment as described above is assembled according to the procedures as described in the following (1) to (3).

Figure 7A:
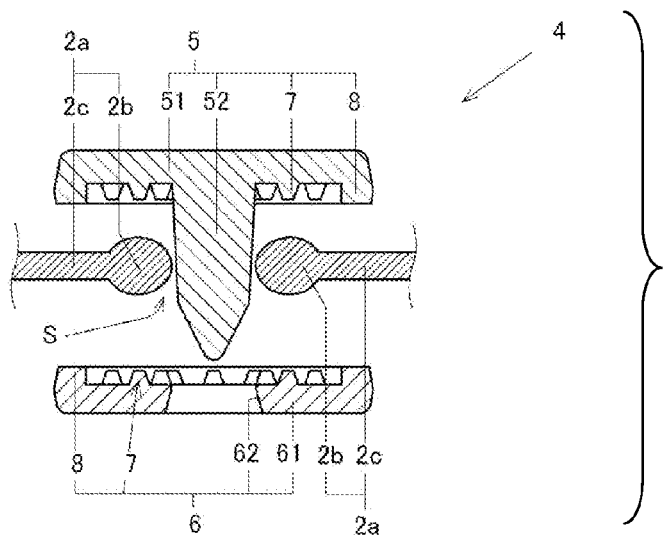
FIGS. 7A, 7B and 7C are explanatory views showing procedures of assembling the end stop according to the first embodiment.

(1) When a pair of fastener tapes 2a and 2a has been closed by engaging a pair of element rows 2u and 2u with each other, as shown in FIG. 7A, the gap S is formed between a pair of core portions 2b and 2b. The male member 5 is arranged over the pair of fastener tapes 2a and 2a so that the inserting male portion 52 passes through the gap S, and the female member 6 is arranged under the pair of fastener tapes 2a and 2a so that the receiving female portion 62 faces the inserting male portion 52.

Figure 7B:
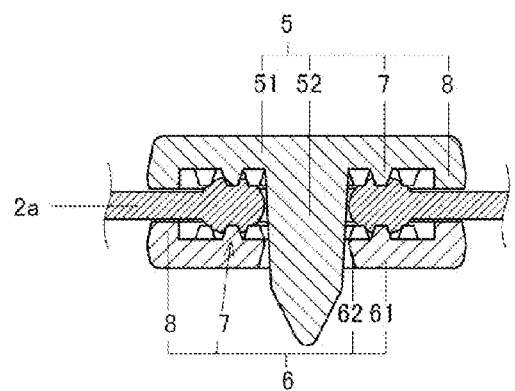

(2) Next, as shown in FIG. 7B, the male member 5 is pressed against the upper surfaces of the pair of fastener tapes 2a and 2a and the female member 6 is pressed against the lower surfaces of the pair of the fastener tapes 2a and 2a.

Figure 7C:
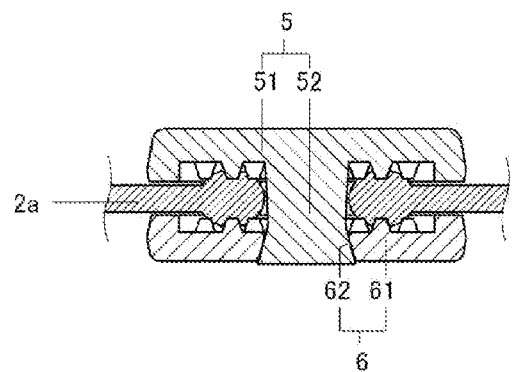

(3) Finally, as shown in FIG. 7C, a tip portion of the inserting male portion 52 protruding from the receiving female portion 62 is deformed by crimping and then the deformed tip portion of the inserting male portion 52 is fitted in the through-hole, which is the receiving female portion 62. The deformed tip portion of the inserting male portion 52 is conformed to a shape of the through-hole, and because the through-hole is formed by the tapered cylindrical surface having a diameter decreased toward the facing surface, the inserting male portion 52 cannot be not removed from the receiving female portion 62 so that the male member 5 and the female member 6 are kept connected to each other.

Figure 3:
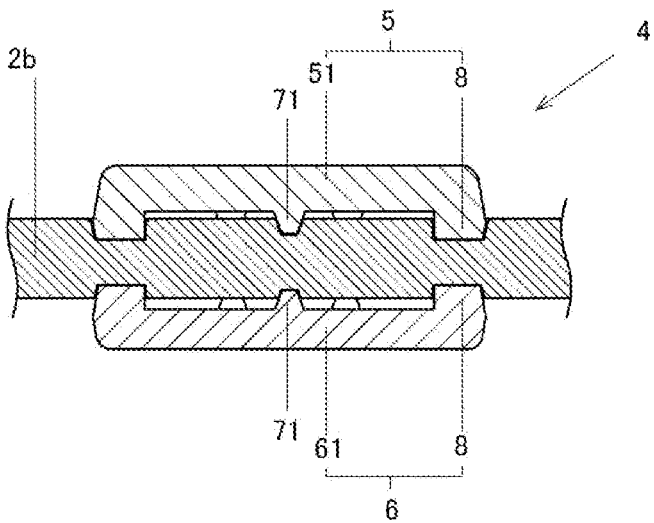
FIG. 3 is a sectional view taken along a line III-III in FIG. 2.

The end stop 4 connected in a such way is configured so that the protrusions 71 and the outer rings 8 of the male member 5 and the female member 6 sandwich each core portion 2b from upper and lower sides thereof. For the outer rings 8, each outer ring 8 of the male member 5 and the female member 6, as shown in FIG. 3, presses to cause each core portion 2b to be recessed at two locations in the front and rear direction. Each core portion 2b is sandwiched from the upper and lower sides thereof by two outer rings 8 and 8 having the protruding length L2 longer than the protruding length L1 of the protrusions 71. For the protrusions 71, a plurality of protrusions 71 of all protrusions 71 constituting each protrusion group 7 of the male member 5 and the female member 6 press to cause each core portion 2b to be recessed from the upper and lower sides thereof.

More specifically, for either of the male member 5 and the female member 6, the first and second protrusion group 7a and 7b are configured so that a plurality of protrusions 71 of all protrusions 71 constituting each thereof press to cause each core portion 2b to be recessed from the upper and lower sides thereof. Alternatively, in FIGS. 4A and 4B, two protrusions 71 of eight protrusions 71 constituting the first protrusion group 7a of the male member 5 are arranged in the gap S between the pair of core portions 2b and 2b and each three protrusions 71 of the remaining six protrusions are respectively arranged to cause one core portion 2b and the other core portion 2b to be recessed, but depending on arrangement of the male member 5 along the circumferential direction, four protrusions 71 of eight protrusions 71 constituting the first protrusion group 7a may be arranged in the gap S and each two protrusions 71 of the remaining four protrusions may be arranged to cause each core portions 2b to be recessed.

Figure 8A:
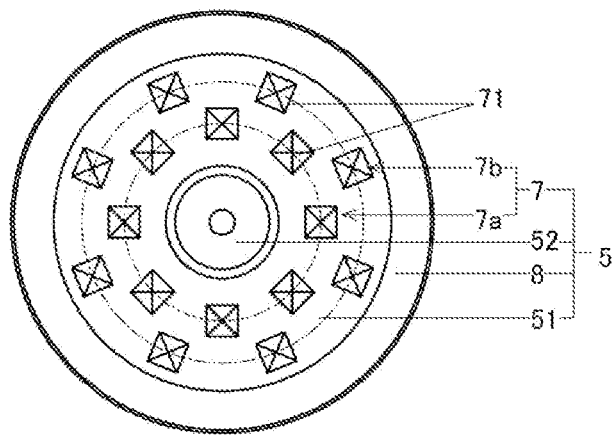
Figure 8B:
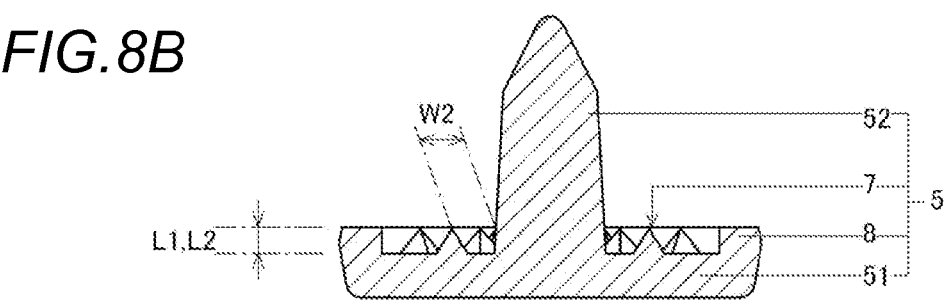

According to the end stop 4 of the first embodiment of the present invention, in the example shown in FIGS. 1 to 7C, the protruding length L1 of the protrusions 71 on the basis of the facing surfaces is shorter than the protruding length L2 of the outer rings 8, but as shown in FIGS. 8A and 8B, the protruding length L1 of the protrusions 71 may be equal to the protruding length L2 of the outer rings 8. Also, according to the end stop 4 of the first embodiment of the invention, in the example shown in FIGS. 1 to 7C, the tip end of the protrusions 71 is formed by a horizontal surface, but as shown in FIGS. 8A and 8B, but the tip end of the protrusions 71 may formed in a sharp shape, such as a pyramid shape. In this case, because the tip end of the protrusions becomes one point, the distance W2 between the tip end of the protrusions 71 and the side surface of the inserting male portion 52 is a distance W2 between the one point and the outer circumferential surface of the inserting male portion 52 as measured on a horizontal straight line drawn to connect the one point and the center of the inserting male portion 52. Also, the distance W2 is preferably set to be equal to or smaller than the width W1 of the core portions 2b as described above.

Figure 9A:
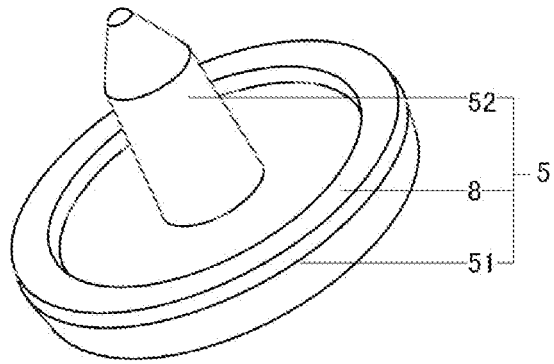
Figure 9B:
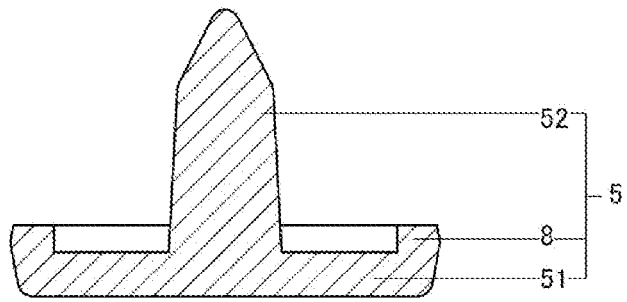

Because the end stop 4 according to the first embodiment of the present invention has an aspect in which the female member 6 has the protrusion group 7, in such an aspect, the male member 5 may not necessarily have the protrusion group 7, and accordingly, if the male member 5 has at least the male base portion 51 and the inserting male portion 52, this is enough. For example, as shown in FIGS. 9A and 9B, the male member 5 may have the male base portion 51, the inserting male portion 52 and the outer ring 8.

Figure 10:
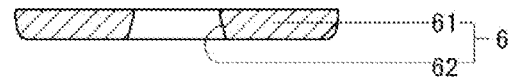
FIG. 10 is a sectional view showing a variant of the female member used in the end stop according to the first embodiment.
Figure 11:
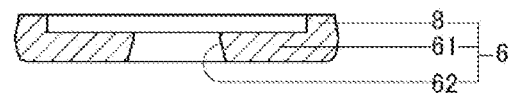
FIG. 11 is a sectional view showing another variant of the female member used in the end stop according to the first embodiment.

According to the end stop 4 of the first embodiment of the present invention, in the example shown in FIGS. 1 to 7C, the protrusion group 7 is provided on each of the facing surfaces of the male member 5 and the female member 6, but as long as the protrusion group 7 is provided on the facing surface of the male member 5, the facing surface of the female member 6 (female base portion 61) may be formed by a horizontal surface not having both of the protrusion group 7 and the outer ring 8 as shown in FIG. 10 and also only the outer ring 8 may be provided on the facing surface of the female base portion 61 as shown in FIG. 11.

Figure 12A:
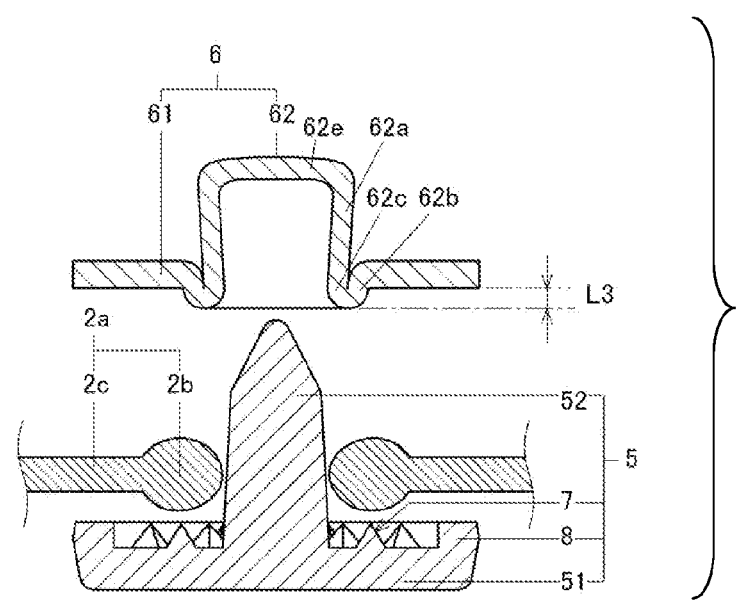
FIG. 12A and FIG. 12B are explanatory views showing procedures of assembling an end stop according to a second embodiment of the invention.
Figure 12B:
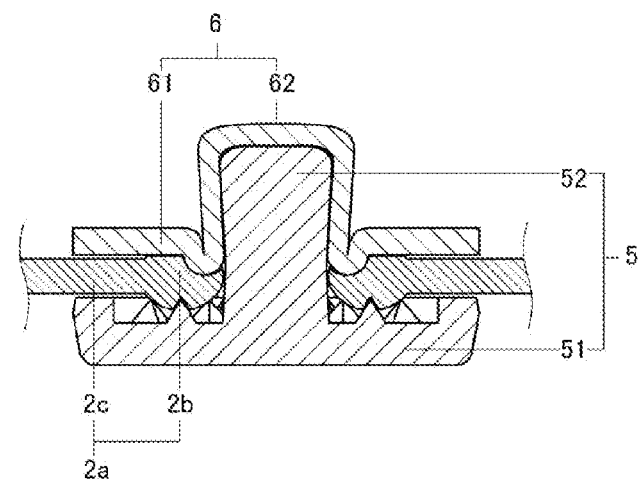

An end stop 4 according to a second embodiment of the present invention, as shown in FIGS. 12A and 12B, has a receiving female portion 62 of a female member 6 configured differently from the receiving female portion 62 of the female member 6 employed in the end stop 4 of the first embodiment.

The female member 6 is a circular ring and circular disk-shaped female base portion 61 and a bottomed cylinder-shaped receiving female portion 62 protruding from an inner circumference of a facing surface of two circular ring-shaped surfaces of the female member 6 toward a direction away from a male member 5. More specifically, the receiving female portion 62 has a cylindrical-shaped body portion 62a having one end continued to the inner circumference of the female base portion 61, and a circular-shaped bottom portion 62e closing the other end of the body portion 62a. The body portion 62a is configured so that an inner circumferential surface thereof is formed by a tapered cylindrical surface having a diameter increased as it goes away from the male member 5. Meanwhile, the one end of the body portion 62a, in which a radial thickness thereof is doubly formed, has an outer wall portion 62b and an inner wall portion 62c in the radial direction. A portion connecting between the outer wall portion 62b and the inner wall portion 62c protrudes more toward a male base portion 51 than the female base portion 61. A tip end of the outer wall portion 62b is continued to the inner circumference of the female base portion 61. But, a protruding length L3 by which the one end of the body portion 62a protrudes toward the male member 5 is equal to or smaller than a thickness dimension of the female base portion 61.

The end stop 4 of the second embodiment as described above is attached on a pair of fastener stringers 2 and 2 according to the procedures as described in the following (1) and (2).

(1) First, as shown in FIG. 12A, the male member 5 is arranged under the pair of fastener tapes 2a and 2a so that an inserting male portion 52 passes through a gap S formed between a pair of core portions 2b and 2b, and the female member 6 is arranged over the pair of fastener tapes 2a and 2a so that the receiving female portion 62 is located over the inserting male portion 52.

(2) Next, as shown in FIG. 12B, the male member 5 is pressed against the lower surfaces of the pair of fastener tapes 2a and 2a and the female member 6 is pressed against the upper surfaces of the pair of the fastener tapes 2a and 2a, and simultaneously, a tip portion of the inserting male portion 52 of the male member 5 is pressed against the bottom portion 62e of the receiving female portion 62 of the female member 6 to be deformed, thereby crimping the inserting male portion 52 to the receiving female portion 62. The deformed tip portion of the inserting male portion 52 is conformed to a shape of the inner circumferential surface of the body portion 62a, and because the inner circumferential surface of the body portion 62a is formed by the tapered cylindrical surface having a diameter increased as it goes away from the male member 5, the inserting male portion 52 cannot be not removed from the receiving female portion 62 so that the male member 5 and the female member 6 are kept connected to each other. In addition, because the receiving female portion 62 is arranged on the upper surface side, an appearance of the end stop 4 constituting a part of an appearance of a slide fastener 1 is provided so that the receiving female portion 62 protrudes from the female base portion 61.

Figure 13A:
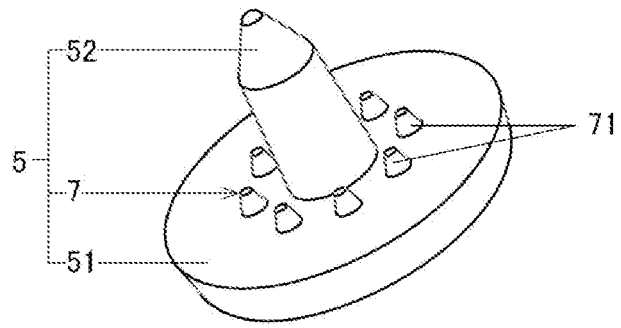
FIGS. 13A and 13B are a perspective view and a sectional view showing a variant of the end stops according to the first and second embodiments of the invention.
Figure 13B:
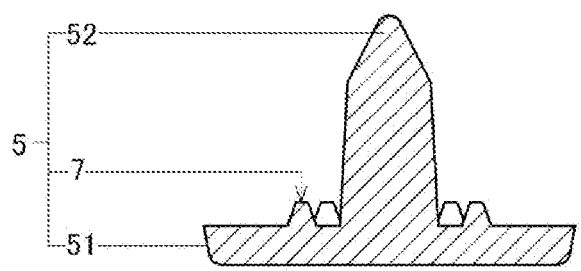

The male member 5 employed in the end stops 4 according to the first and second embodiments of the present invention has the outer ring 8 as shown in FIGS. 1 to 7C, but may not have the outer ring 8 as shown in FIGS. 13A and 13B, i.e., just have the male base portion 51, the inserting male portion 52, and the protrusion group 7. Meanwhile, the protrusion group 7 of the male member 5 in FIGS. 13A and 13B is constituted of eight protrusions and also the protrusions 71 are arranged at equal angles (45°) along a circumferential direction of one circle.

Figure 14:
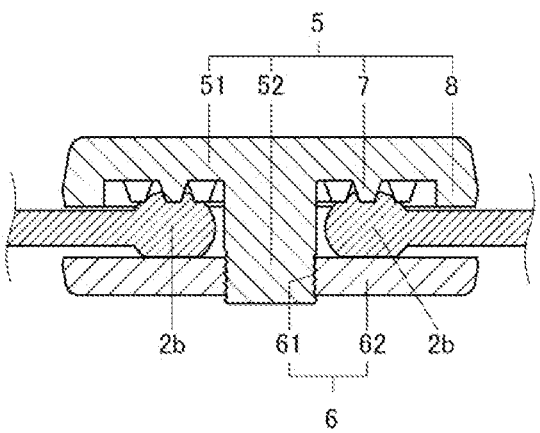
FIG. 14 is a sectional view showing an end stop according to a third embodiment of the invention.

An end stop 4 according to a third embodiment of the present invention, as shown in FIG. 14, is different from the end stop 4 of the first embodiment in a connection structure between the inserting male portion 52 of the male portion 5 and the receiving female portion 62 of the female portion 6.

The inserting male portion 52 has a tip end formed as a male screw. The receiving female portion 62 is a female screw extending through the center portion of the female base portion 61. By screwing the male screw into the female screw, the male member 5 and the female member 6 is connected with each other and a pair of core portions 2b and 2b is sandwiched by the male portion 5 and the female portion 6.

Figure 15:
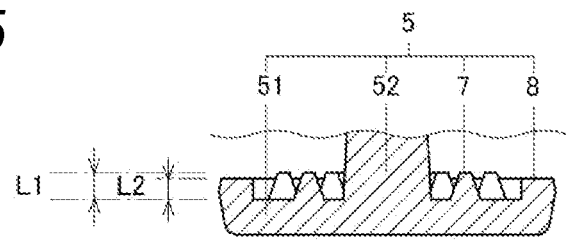
FIG. 15 is a sectional view showing a variant of the male member used in the end stops according to the first to third embodiments of the invention.

The male member 5 employed in the end stops 4 according to the first to third embodiments of the present invention is configured so that the protruding length L1 of the protrusions 71 is shorter than the protruding length L2 of the outer ring 8 as shown in FIGS. 1 to 7C or that the protruding length L1 of the protrusions 71 is equal to the protruding length L2 of the outer ring 8 as shown in FIGS. 8A and 8B, but is not limited thereto and thus may be configured so that the protruding length L1 of the protrusions 71 is longer than the protruding length L2 of the outer ring 8 as shown in FIG. 15.

Figure 16A:
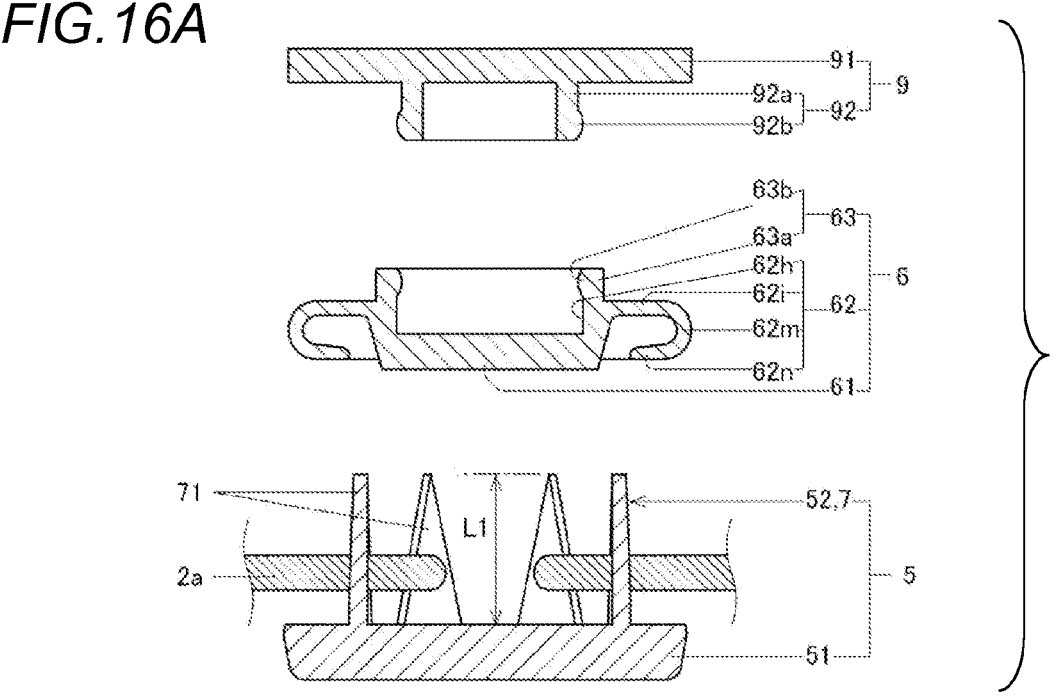
FIGS. 16A and 16B are explanatory views showing procedures of assembling an end stop according to a fourth embodiment of the invention.
Figure 16B:
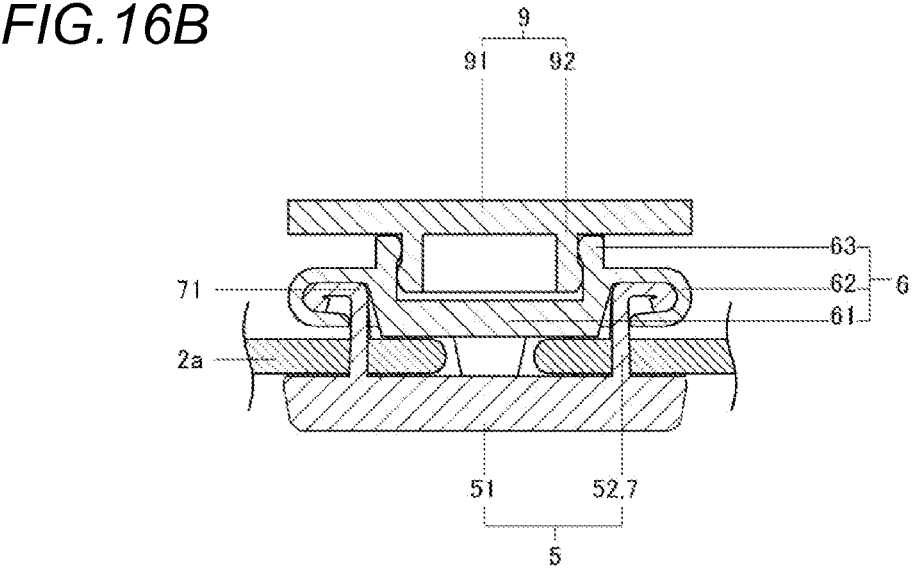

An end stop 4 according to a fourth embodiment of the present invention, as shown in FIGS. 16A and 16B, is different from the end stop 4 of the first embodiment, in that a male member 5 has an inserting male portion 52 and a protrusion group 7 formed by an identical thing and thus a female base portion 61 and a receiving female portion 62 of a female portion 6 are formed correspondingly to the inserting male portion 52 and the protrusion group 7, which are the identical thing, (hereinafter, generally referred to as a 'protrusion group' in the present embodiment) and also that in addition to the male member 5 and the female member 6, an ornamental member 9 is removably provided on the female member 6. Also, a slider fastener 1 employing the end stop 4 of the fourth embodiment is different form the slide fastener employing the end stop 4 of the first embodiment in that the slider fastener 1 has not core portions 2b, that is, a thickness of a pair of fastener tapes 2a and 2a in an upward and downward direction has a constant dimension over a width direction thereof.

More specifically, the protrusion group 7 is formed in a concentric shape on a circular disk-shaped male member 5. Also, the protrusion group 7 is constituted of five protrusions 71, and the protrusions 71 are arranged on one circle circumference about the center of a facing surface of the male base portion 51 at every 72° as an equal angle. Thus, in this case, all protrusions 71 are also arranged in a concentric circle shape with the male member 5. Also, if all protrusions 71 are considered as one protrusion group 7, which is an aggregate thereof, the protrusion group 7 is formed in a concentric shape with the male member 5.

Each protrusion 71 is a triangular plate, more specifically an isosceles triangular plate. Due to such an isosceles triangle, each protrusion 71 has two equal sides and one bottom side. Also, two apexes located both ends of the bottom side are arranged on the one circle circumference about the center of the facing surface of the male base portion 51.

A protruding length L1 of each protrusion 71 is sufficiently longer than a thickness of the fastener tapes 2a, and therefore, when the fastener tapes 2a are sandwiched by the male member 5 and the female member 6, the protrusion 71 penetrates the fastener tapes 2a.

The female member 6 has a female base portion 61 having a radius shorter than that of the protrusion group 7 of the male member 5, a receiving female portion 62 protruding on a radial outer side of the female base portion 62 in a concentric shape (more specifically, a concentric circle shape) and recessed on a surface side thereof facing the male base portion 51, and an attached portion 63 protruding from a surface side (upper surface side) thereof opposite to the facing surface of the female base portion 61 and configured to allow the ornamental member 9 to be attached thereon. Meanwhile, an outer contour of the female member 6 is a circular shape, which is an outer contour of the receiving female member 62.

The receiving female portion 62 has a hole shape (more specifically, a circular ring-shaped groove). The ring-shaped groove is configured so that a groove width (a radial groove width dimension) of a side thereof facing the male member 5, which corresponds to an inlet side, is narrower than a groove width of a side thereof away from the male member 5, which corresponds to a back side, and also the groove width of the back side is widened radially outward relative the groove width of the inlet side. More specifically, the receiving female portion 62 has a ring-shaped spacing portion 62h protruding from the entire circumference of an outer circumferential edge portion of the female base portion 61 toward the surface side (upper side) opposite to the facing surface of the female base portion 61, a flange portion 62i protruding radially outward from the entire circumference of a distal end of the spacing portion 62h, an approaching portion 62m extending from the entire circumference of a radial outer circumference of the flange portion 62i toward the female base portion 61, and an inward portion 62n extending radially inward from the entire circumference of a distal end of the approaching portion 62m toward an outer circumferential surface of the spacing portion 62h. Also, an outer circumferential surface of the female base portion 61 and a radial outer circumferential surface of the spacing portion 62h are formed by a tapered cylindrical surface having a radial dimension gradually increased as it goes away from the facing surface of the female member 6.

The attached portion 63 includes the spacing portion 62h of the receiving female portion 62, a cylindrical circumferential wall portion 63a protruding upward from an distal end (upper end) of the spacing portion 62h, and a ring-shaped inward-enlarged portion 63b protruding radially inward from a distal end portion (upper end portion) of the circumferential wall portion 63a.

The ornamental member 9 has an ornamental body portion 91 covering the upper surface of the female member 6 and an attaching portion 92 protruding from a surface of the ornamental body portion 91 facing the female member 6 and configured to be attached on the attached portion 63. The attaching portion 92 has a cylindrical portion 92a having a radius smaller than that of the circumferential wall portion 63a to be received inside the circumferential wall portion 63a, and a ring-shaped outward-enlarged portion 92b protruding outward from a distal end portion of the cylindrical portion 92a over the entire radial circumference thereof. Meanwhile, the ornamental member 9 is made of metal or soft synthetic resin (e.g., silicone or urethane). The ornamental body portion 91 may have a character or a pattern attached on a surface side thereof opposite to the facing surface.

The end stop 4 of the fourth embodiment is attached on a pair of fastener stringers 2 and 2 according to the procedures as described in the following (1) and (2).

(1) First, as shown in FIG. 16A, the male member 5 is arranged under opposing right and left side edge portions of a pair of fastener tapes 2a and 2a, and the protrusions 71 constituting the protrusion group 7 of the male member 5 are pierced through the right and left side edge portions. Then, the female member 6 is arranged on an upper side of the pair of fastener tapes 2a and 2a so that all protrusions 71 arranged in a concentric circle shape are fitted into the receiving female portion 62, which is a ring-shaped groove.

(2) Next, as shown in FIG. 16B, when the male member 5 is pressed against the lower surfaces of the pair of fastener tapes 2a and 2a and the female member 6 is pressed against the upper surfaced of the pair of fastener tapes 2a and 2a, even if the centers of the male member 5 and the female member 6 are slightly deviated from each other, some protrusions 71 constituting the protrusion group 7 are collided against the tapered cylindrical surface of the receiving female portion 62 so that the centers of the male member 5 and the female member 6 are coincided with each other.

Then, tip portions of the protrusions 71 are collided against the flange portion 62*i* of the receiving portion 62 to be deformed, and thus the tip portions of the protrusions 71 are extruded radially outward, thereby crimping each protrusion 71 to the receiving female portion 62.

(3) Finally, when the attaching portion 92 of the ornamental member 9 is inserted into the attached portion 63 of the female member 6, the outward-enlarged portion 92*b* of the attaching portion 92 is snap-fitted under the inward-enlarged portion 63*b* of the attached portion 63, thereby attaching the ornamental member 9 to the female member 6.

Figure 17:
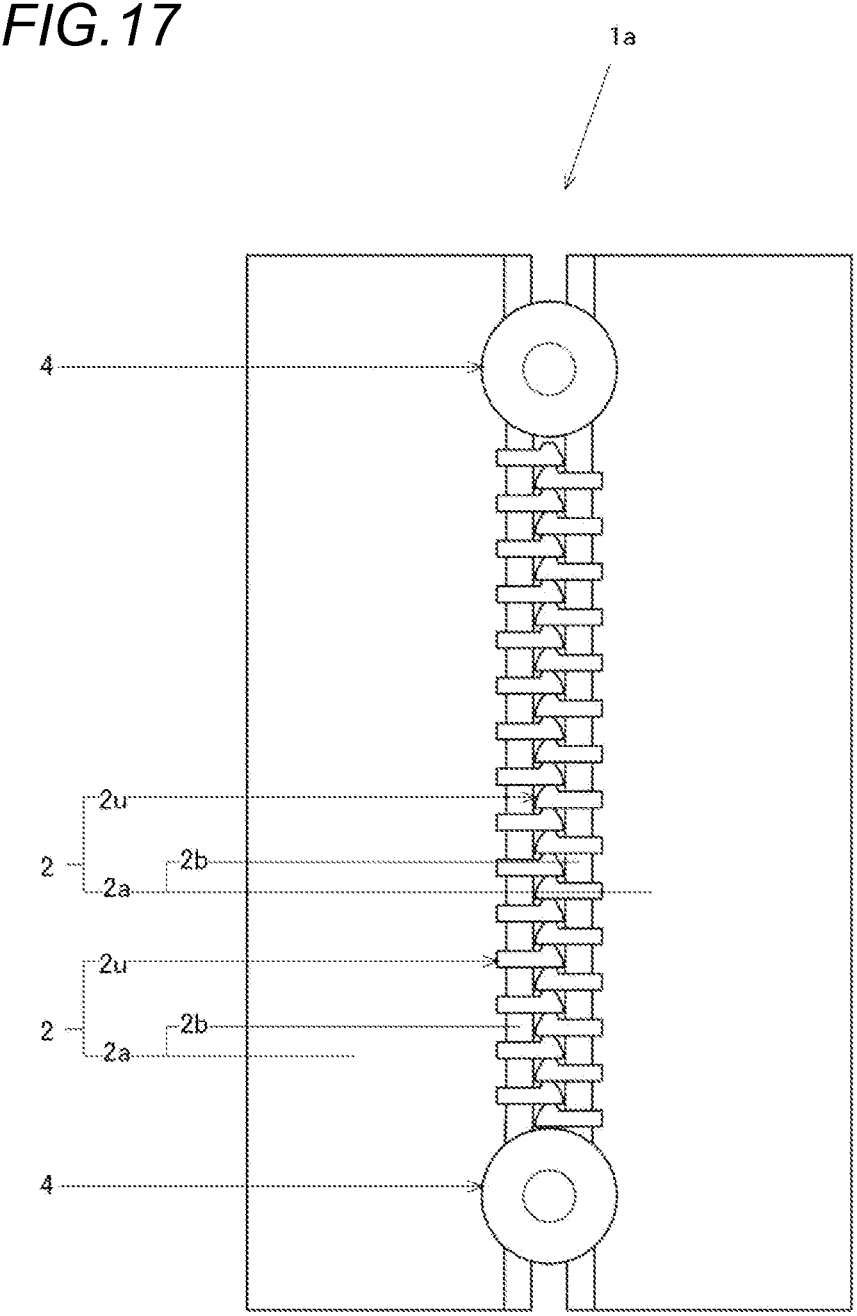
FIG. 17 is a plan view showing an ornamental fastener employing a end stop of the invention.

The end stop 4 of the present invention may be employed in an ornamental fastener 1*a* as shown in FIG. 17, not limited to the slide fastener 1 as shown in FIG. 1. The ornamental fastener 1*a* is different from the slide fastener in that the slide 3 is not provided and a pair of element rows 2*u* and 2*u* are kept engaged with each other. More specifically, the ornamental fastener 1 has end stops 4 respectively arranged at locations, which are located on both side in an extending direction of the pair of element rows 2*u* and 2*u* engaged with each other and also adjacent to the pair of element rows 2*u* and 2*u*, to be fixed to a pair of core portions 2*b* and 2*b*. In the ornamental fastener 1*a*, the end stop 4 according to the second embodiment of the present invention is employed.

The present invention is not limited to the foregoing embodiments but can be suitably changed without departing from the concept of the invention. For example, although the male member 5 of the end stop 4 according to the first embodiment is configured so that the protrusion group 7 includes the protrusions 71 arranged on two concentric circles, the invention is not limited thereto and thus may be configured so that the protrusions 71 are arranged on three or more concentric circles. Also, although the male member 5 of the end stop 4 according to the first embodiment is configured so that the protrusions 71 are arranged at equal angles (22.5°) along the circumferential direction about the center of the male base portion 51, the invention is not limited thereto and thus may be configured so that the protrusions 71 are arranged at unequal angles along the circumferential direction, and more specifically, so that, for example, one, two, or all of the protrusions 71 are arranged at different angles. Namely, the protrusions 71 may be arranged to be spaced from each other at predetermined angles over the entire circumference along the circumferential direction. But, in this case, at least one protrusion 71 is preferably arranged within a range of 45°. Thus, a lower limit in the number of protrusions 71 constituting the protrusion group 7 preferably is eight.

Also, if the protrusions 71 are arranged over the entire circumference along the circumferential direction, the number of the protrusions 71 constituting the protrusion group 7 does not matter, and thus for example, protrusions more than sixteen employed in the first embodiment may be employed. However, if the number of protrusions constituting the protrusion group 7 is too many, manufacturing becomes difficult. Accordingly, the approximately double (thirty two) of the number of protrusions employed in the first embodiment is preferable as an upper limit of the number of protrusions constituting the protrusion group 7. In this case, preferably, the protrusion group 7 is constituted of thirty two protrusions 71 and the protrusions 71 are arranged at every 11.25° along the circumferential direction. The number of all protrusions 71 constituting the protrusion group 7 preferably is a positive integer of 8 or greater and 32 or smaller.

Meanwhile, although the number and arrangement with respect to the protrusion group 7 of the male member 5 are described herein, the same number and arrangement may be applied to the protrusion group 7 of the female member 6.

Also, although the end stop 4 of each embodiment as described above is configured so that all protrusions 71 constituting the protrusion group 7 are regularly arranged over the entire circumference along the circumferential direction (e.g., on the same circle circumference or in a concentric circle shape), the present invention is not limited thereto and thus if some of all protrusions 71 constituting the protrusion group 7 are regularly arranged, the others may be irregularly arranged. Thus, that a plurality of protrusions 71 constituting the protrusion group 7 are regularly arranged encompasses a case where all protrusions 71 constituting the protrusion group 7 are regularly arranged and a case where some of all protrusions 71 constituting the protrusion group 7 are regularly arranged and the others are be irregularly arranged.

What is claimed is:

1. A slide fastener comprising:
    a pair of fastener tapes extending in a front and rear direction and respectively arranged on right and left sides;
    a pair of element rows fixed along opposing right and left side edge portions of the pair of fastener tapes;
    an end stop connecting the pair of fastener tapes, the end stop comprising:
        a male member and a female member configured to sandwich the opposing right and left side edge portions of the pair of fastener tapes from both sides thereof in an upward and downward direction, which is a thickness direction thereof, the male member and the female member each having a circular outer contour;
        wherein the male member comprises a circular disk-shaped male base member including a facing surface having a circular shape and configured for facing the female member and an inserting male portion protruding in a concentric shape from the male base portion and configured to be inserted into the female member,
        wherein the female member comprises a circular disk-shaped female base member including a facing surface having a circular shape and configured for facing the male member and a receiving female portion formed in a concentric shape with the female base portion and configured to receive and connect at least a part of the inserting male portion,
        wherein at least one of the facing surface of the male base portion and the facing surface of the female base portion is provided with a protrusion group protruding therefrom, and
        wherein the protrusion group includes a plurality of protrusions arranged in at least one concentric circle shape with the at least one facing surface provided with the protrusion group and the plurality of protrusions are spaced from each other at predetermined angles arrayed over an entire circumference of the at least one concentric circle shape along a circumferential direction thereof; and
    a slider configured to move along the pair of element rows to engage and disengage the pair of element rows.

2. The slide fastener according to claim 1,
    wherein the receiving female portion is formed on a center portion of the female base portion,
    wherein the inserting male portion is a different thing from the protrusion group, is formed on a center portion of the male base portion, and is connected to the receiving female portion after passing through a gap formed between the opposing right and left side edge portions of the pair of fastener tapes, and wherein the plurality of protrusions are arranged on the facing surface to be located more radially outward than the inserting male portion.

3. The slide fastener according to claim 2, wherein the end stop is for connecting the pair of fastener tapes in which the opposing right and left side edge portions are core portions having a thickness thicker than adjoining portions laterally adjacent thereto, and wherein the plurality of protrusions have a protruding length causing the core portions to be recessed.

4. The slide fastener according to claim 3, wherein two or more protrusions of the plurality of protrusions are arranged to be spaced from each other at predetermined angles within each semi-circular area of the at least one facing surface provided with the protrusion group along the circumferential direction to cause each core portion to be recessed at two or more locations.

5. The slide fastener according to claim 3, wherein the plurality of protrusions are arranged to be spaced from each other at equal angles arrayed over the entire circumference of the at least one concentric circle shape along the circumferential direction.

6. The slide fastener according to claim 5, wherein a number of protrusions arranged to be spaced from each other at equal angles arrayed over the entire circumference of the at least one concentric circle shape along the circumferential direction is a positive integer between 8 and 32.

7. The slide fastener according to claim 3, wherein the plurality of protrusions are arranged in a multiple concentric circle shape.

8. The end stop slide fastener according to claim 3, wherein at least one of the facing surface of the male base portion and the facing surface of the female base portion is provided with an outer ring protruding over the entire circumference of an outer circumferential edge portion thereof and configured to come in contact with a pair of core portions.

9. The slide fastener according to claim 8, wherein the facing surface of the male base portion includes the protrusion group, and the protrusion group is arranged to be closer to the inserting male portion than the outer ring in a radial direction of the facing surface of the male base portion.

10. An ornamental fastener comprising:

a pair of fastener tapes extending in a front and rear direction and respectively arranged on right and left sides;

a pair of element rows fixed along the opposing right and left side edge portions of the pair of fastener tapes and kept engaged with each other; and an end stop connecting the pair of fastener tapes, the end stop comprising:

a male member and a female member configured to sandwich the opposing right and left side edge portions of the pair of fastener tapes from both sides thereof in an upward and downward direction, which is a thickness direction thereof, the male member and the female member each having a circular outer contour;

wherein the male member comprises a circular disk-shaped male base member including a facing surface having a circular shape and configured for facing the female member and an inserting male portion protruding in a concentric shape from the male base portion and configured to be inserted into the female member, wherein the female member comprises a circular disk-shaped female base member including a facing surface having a circular shape and configured for facing the male member and a receiving female portion formed in a concentric shape with the female base portion and configured to receive and connect at least a part of the inserting male portion, wherein at least one of the facing surface of the male base portion and the facing surface of the female base portion is provided with a protrusion group protruding therefrom, and wherein the protrusion group includes a plurality of protrusions arranged in at least one concentric circle shape with the at least one facing surface provided with the protrusion group and the plurality of protrusions are spaced from each other at predetermined angles arrayed over an entire circumference of the at least one concentric circle shape along a circumferential direction thereof.

11. The ornamental fastener according to claim 10, wherein the receiving female portion is formed on a center portion of the female base portion, wherein the inserting male portion is a different thing from the protrusion group, is formed on a center portion of the male base portion, and is connected to the receiving female portion after passing through a gap formed between the opposing right and left side edge portions of the pair of fastener tapes, and wherein the plurality of protrusions are arranged on the facing surface to be located more radially outward than the inserting male portion.

12. The ornamental fastener according to claim 11, wherein the end stop is for connecting the pair of fastener tapes in which the opposing right and left side edge portions are core portions having a thickness thicker than adjoining portions laterally adjacent thereto, and wherein the plurality of protrusions have a protruding length causing the core portions to be recessed.

13. The ornamental fastener according to claim 12, wherein two or more protrusions of the plurality of protrusions are arranged to be spaced from each other at predetermined angles within each semi-circular area of the at least one facing surface provided with the protrusion group along the circumferential direction to cause each core portion to be recessed at two or more locations.

14. The ornamental fastener according to claim 12, wherein the plurality of protrusions are arranged to be spaced from each other at equal angles arrayed over the entire circumference of the at least one concentric circle shape along the circumferential direction.

15. The ornamental fastener according to claim 14, wherein a number of protrusions arranged to be spaced from each other at equal angles arrayed over the entire circumference of the at least one concentric circle shape along the circumferential direction is a positive integer between 8 and 32.

16. The ornamental fastener according to claim 12, wherein the plurality of protrusions are arranged in a multiple concentric circle shape.

17. The ornamental fastener according to claim 12, wherein at least one of the facing surface of the male base portion and the facing surface of the female base portion is provided with an outer ring protruding over the entire circumference of an outer circumferential edge portion thereof and configured to come in contact with a pair of core portions.

18. The ornamental fastener according to claim 17, wherein the facing surface of the male base portion includes the protrusion group, and the protrusion group is arranged to be closer to the inserting male portion than the outer ring in a radial direction of the facing surface of the male base portion.

* * * * *

UNITED STATES PATENT AND TRADEMARK OFFICE
CERTIFICATE OF CORRECTION

PATENT NO. : 9,936,775 B2
APPLICATION NO. : 14/573490
DATED : April 10, 2018
INVENTOR(S) : Go Takani et al.

It is certified that error appears in the above-identified patent and that said Letters Patent is hereby corrected as shown below:

In the Claims

In Column 17, Line 36, in Claim 8, after "The" delete "end stop".

Signed and Sealed this
Twenty-second Day of May, 2018

Andrei Iancu
*Director of the United States Patent and Trademark Office*